(12) United States Patent
Voelckel et al.

(10) Patent No.: US 9,805,191 B2
(45) Date of Patent: Oct. 31, 2017

(54) METHOD FOR PROTECTING AN ELECTRONIC TERMINAL, CORRESPONDING COMPUTER PROGRAM AND ELECTRONIC TERMINAL

(71) Applicant: COMPAGNIE INDUSTRIELLE ET FI-NANCIERE D'INGENIERIE "INGENICO", Paris (FR)

(72) Inventors: Jean-Marc Voelckel, Maurepas (FR); Isaac Soussana, Jerusalem (IL)

(73) Assignee: INGENICO GROUP, Paris (FR)

(*) Notice: Subject to any disclaimer, the term of this patent is extended or adjusted under 35 U.S.C. 154(b) by 0 days.

(21) Appl. No.: 14/652,330

(22) PCT Filed: Dec. 10, 2013

(86) PCT No.: PCT/EP2013/076137
§ 371 (c)(1),
(2) Date: Jun. 15, 2015

(87) PCT Pub. No.: WO2014/090829
PCT Pub. Date: Jun. 19, 2014

(65) Prior Publication Data
US 2015/0302194 A1 Oct. 22, 2015

(30) Foreign Application Priority Data
Dec. 14, 2012 (FR) .................................. 12 62038

(51) Int. Cl.
*G06F 21/00* (2013.01)
*G06F 21/55* (2013.01)
*G06F 21/88* (2013.01)

(52) U.S. Cl.
CPC ............ *G06F 21/554* (2013.01); *G06F 21/88* (2013.01); *G06F 2221/034* (2013.01)

(58) Field of Classification Search
CPC ........................................... G06F 21/55–21/56
USPC ....................................................... 726/22–25
See application file for complete search history.

(56) References Cited

U.S. PATENT DOCUMENTS 8,774,761 B2 * 7/2014 Paddon ................... H04M 1/66
455/410
2005/0222801 A1 10/2005 Wulff et al.

OTHER PUBLICATIONS

International Search Report dated Jan. 30, 2014 for corresponding International Application No. PCT/EP2013/076137, filed Dec. 10, 2013.

(Continued)

*Primary Examiner* — Anthony Brown
(74) *Attorney, Agent, or Firm* — David D. Brush; Westman, Champlin & Koehler, P.A.

(57) ABSTRACT

A method is provided for protecting an electronic terminal. The method includes: activating a state of monitoring the terminal; in the state of monitoring, detecting a manipulation of the terminal, generating the passage of the terminal to a so-called suspect state, representative of a risk of attempted fraudulent use of the terminal; in the suspect state, triggering a reaction by the terminal, the reaction of the terminal including updating an alert level representative of a probability of attempted fraudulent use of the terminal, and a implementing at least one reactive action dependent on the alert level.

10 Claims, 5 Drawing Sheets

(56) References Cited

OTHER PUBLICATIONS

English translation of the International Written Opinion dated Janaury 30, 2014 for corresponding International Application No. PCT/EP2013/076137, filed Dec. 10, 2013.
French Search Report dated Sep. 3, 2013 for corresponding French Application No. 1262038, filed Dec. 14, 2012.

* cited by examiner

METHOD FOR PROTECTING AN ELECTRONIC TERMINAL, CORRESPONDING COMPUTER PROGRAM AND ELECTRONIC TERMINAL

1. CROSS-REFERENCE TO RELATED APPLICATION

This Application is a Section 371 National Stage Application of International Application No. PCT/EP2013/076137, filed Dec. 10, 2013, which is incorporated by reference in its entirety and published as WO 2014/090829 on Jun. 19, 2014, not in English.

2. FIELD OF THE INVENTION

The field of the invention is that of electronic terminals and especially electronic terminals designed to manipulate sensitive data, for example electronic payment terminals or terminals for reading and/or updating electronic cards containing personal medical data (such as the carte vitale or French national health insurance card) and/or notification of a medical procedure to a health care organization. The field of the invention relates more particularly to measures against theft and/or the misuse of such terminals for malicious purposes.

3. PRIOR ART

Owing to the nature of the operations for which they are intended, terminals handling sensitive data related especially to monetary aspects such as electronic payment terminals constitute preferred targets of computer attack.

They can often be stolen and then returned with parasitic components installed within them.

In particular, such a component can be aimed at impairing the availability or the operation of this terminal or at using the information provided by a user and intercepted by the component, for example by classic "data sniffing" techniques to carry out fraudulent payment transactions.

Many prior-art techniques are aimed at protecting payment terminals from such attack.

Certain techniques are aimed combating the theft of terminals.

These techniques may for example be means of physical protection such as the attaching of terminals to a support such as a base, a wall or a tablet so as to make it difficult to transport them.

However, for reasons of facility of use, payment terminals are often mobile. This is the case for example in restaurants where mobile terminals are used to avoid requiring a customer to move when making his payment by bankcard. The small size and autonomy of such terminals make it difficult to keep them under surveillance (by using human resources for example or video surveillance means). One drawback of these mobile terminals is that they are thus greatly exposed to theft.

Other prior-art solutions seek to protect payment terminals against intrusion. These may be software or hardware means used especially to detect an intrusion (for example an opening of the casing of a terminal).

Software protection means such as the application of countermeasures in a microprocessor of a payment terminal have also been used.

One drawback of these prior-art techniques lies in the fact that such techniques are not always sufficient to detect an attempt at theft or a misuse of an electronic terminal or sometimes detect these events only belatedly, sometime after the attack.

4. SUMMARY OF THE INVENTION

The inventors have noticed that an attempt to attack an electronic terminal can be detected by the unusual character of a handling operation performed on the terminal.

Indeed, terminals intended for handling sensitive data (payment terminals, terminals for reading and/or the updating electronic cards containing personal medical data and/or enabling notification of a medical procedure to a health care organization) are often installed in closed locations such as medical clinics, secretariats, stores, restaurants or bank agencies having preset opening times (conventionally 07.00 to 21.00) or closing times that can be defined in advance (weekends, holidays, vacation times or work times). Thus, they are normally useable only during periods of accessibility to these closed places. As a consequence, an action on the terminal at a time when a store or a secretariat office is closed (for example in the middle of the night) can therefore be considered to be suspect.

Consequently, the invention relates to a method for protecting an electronic terminal combining the following steps:

activating a state of surveillance of said terminal;
in said state of surveillance, detecting a handling of said terminal, generating the passage of said terminal into a state known as a suspect state, representing a risk of an attempt at fraudulent use of said terminal;
in said suspect state, triggering a reaction by said terminal;
said step of reaction of said terminal comprises a step for updating a level of alert representing a probability of an attempt at fraudulent use of said terminal, and a step for implementing at least one reactive action according to said level of alert.

Thus, the method of the invention makes it possible to detect attempts at fraudulent use that would not have been detected by the prior-art solutions (detecting an intrusion in the terminal, detecting an opening of the terminal, substitution of the terminal, etc.) for example because this is a discreet handling operation that is conventional for a payment terminal but unusual for the terminal concerned, because they are outside the usual times-slots of use, or because the handling leads to an unauthorized movement of the terminal or a movement that is not compatible with its installation.

This a major advantage as compared with the prior art.

According to one particular characteristic of the invention, said step for activating is implemented when the current value of at least one piece of information for characterizing a context of said terminal is situated in a predefined range of values of said information for characterizing.

Such an embodiment offers the advantage of tracking handling operations performed on the terminal only when one such surveillance is useful (i.e. likely to lead to the confirmation of an attempt at fraudulent use) so as to economize on the resources of the terminal and especially when the method of the invention used for a portable terminal, to economize on the battery of the terminal.

In certain embodiments of the invention, placing the apparatus in a state of surveillance can be done automatically by the terminal, especially periodically, for example at times when the store, the secretariat office or the bank agency in which the terminal is situated are closed.

In this embodiment of the invention, the information for characterizing is a time-stamp type piece of data enabling the definition of the time-slots during which it is sought to detect operations for handling the terminal, it being assumed that this terminal is incapable of being handled during these time-slots.

These time-slots can especially take account of closing days (weekends, holidays, vacations) or on the contrary programmed periods of maintenance of the terminal.

According to one particular characteristic of the invention, said step for detecting a handling of said terminal comprises a sub-step for comparing the current value of at least one piece of information for characterizing a context of said terminal with a predefined range of values of said information for characterizing.

Such an embodiment offers the advantage of systematically detecting certain handling operations and then deciding whether these operations are unusual or not on the basis of certain predefined parameters. For example in the case of a terminal that is continuously fixed to a support, the orientation or localization of the terminal during a movement of the terminal would be compared with a preset range of values corresponding to the degree of freedom of the terminal on a support.

According to one particular characteristic of the invention, said handling belongs to the group of events comprising:
  an action on an input control component of an interface of said terminal;
  an overturning of said terminal;
  a partial rotation of said terminal;
  a shift of said terminal;
  a pressure on a portion of a casing of the terminal;
  a combination of at least two of said events.

For example, the invention in its different particular embodiments is used to detect an attempt at fraudulent use through the detection of a certain pressure on a key of the keypad of the terminal or else the simple handling of the terminal, exerting a pressure on the casing or else a more abrupt handling of the terminal involving a shift, an overturning or rotation of this terminal. In certain embodiments, the invention makes it possible to detect an attempt at fraudulent use of the terminal only when one or more of the above-mentioned events occurs (for example an overturning of the terminal or pressure on the casing).

According to one particular characteristic of the invention, said piece of information for characterizing belongs to the group comprising:
  a piece of information coming from a time-stamp;
  an orientation of said terminal;
  a localizing of said terminal;
  an acceleration or a speed of movement of said terminal;
  a combination of at least two pieces of the information in the group.

According to one particular characteristic of the invention, the method furthermore comprises a step for deactivating said state of surveillance.

Thus, the surveillance of the terminal can be deactivated automatically, for example because the information characterizing the context is no longer situated in the range of predefined values, or it can be deactivated by an authorized third party (either locally through an interface control means of the component or remotely through communications means of the terminal, for example a remote takeover of control or the reception of a particular code).

According to one particular characteristic of the invention, said reactive action belongs to the group comprising:
  an at least partial blocking of said terminal;
  an erasure of at least one part of the sensitive data of said terminal;
  a falsification and/or a corruption of at least one part of the sensitive data of said terminal;
  a sending of a warning message;
  a recording by said terminal of at least one piece of information representing said handling;
  a combination of at least two of said actions of said group.

In particular, one embodiment in which the reaction of the terminal comprises the generation of falsified data offers the advantage of discretion towards a malicious third party making it possible to avoid alerting him to the discovery of an attempt at fraudulent use.

In particular, it may be necessary to replace the sensitive data by particular data, making the falsification obvious to a controlling third party and thus improving the traceability of the operations performed by the malicious third party after the attack.

Besides, the sending of a warning message can also be done discreetly, without drawing the attention of the malicious third party, while at the same time enabling subsequent intervention, for example by the owner of the terminal or a surveillance service.

According to the invention, said step of reaction of said terminal comprises a step for updating a level of alert representing a probability of an attempt at fraudulent use of said terminal and a step for implementing a reactive action according to said level of alert.

Such a situation offers the advantage of enabling a gradual reaction of the terminal to the detected handling operations.

For example, in a first level of alert, the terminal limits itself to sending a message towards a surveillance center. In a second level of alert, it can in addition falsify a part of the sensitive data that it contains.

According to another aspect, the invention relates to a computer program product comprising program code instructions to implement the above-mentioned method (in any one of its different embodiments) when said program is executed on a computer.

Another embodiment of the invention proposes a computer-readable and non-transient storage medium storing a computer program comprising a set of executable instructions executable by a computer to implement the above-mentioned method in any one of its different embodiments.

According to yet another aspect, the invention also pertains to an electronic terminal comprising:
  means for activating a state of surveillance of said terminal;
  in said state of surveillance, means for detecting a handling of said terminal, generating the passage of said terminal into a state known as a suspect state, representing a risk of an attempt at fraudulent use of said terminal;
  in said suspect state, means for triggering a reaction by said terminal, said means for triggering a reaction by said terminal comprise means for updating a level of alert representing a probability of an attempt at fraudulent use of said terminal, and
  means for implementing at least one reactive action as a function of said level of alert.

According to one particular characteristic, the electronic terminal consists of a payment terminal.

5. LIST OF FIGURES

Other features and advantages of the invention shall appear more clearly from the following description of a preferred embodiment, given by way of a simple, illustrative and non-exhaustive example and from the appended drawings, of which:

FIG. 1 presents a functional block diagram of the invention in one embodiment;

In all the above figures, the same numerical reference is assigned to similar steps or components.

6. DESCRIPTION OF ONE EMBODIMENT OF THE INVENTION 6.1 General Principle

The general principle of the invention consists in detecting any abnormal handling of an electronic terminal intended for the handling of sensitive data, for example a payment terminal or a terminal for reading and/or updating electronic cards containing personal medical data and/or making notifications of medical procedures to a health care organization. Unlike in the prior-art solutions, this may be a handling operation of a nature that is not of itself characteristic of an attack (for example because it is a handling operation commonly performed on the terminal) but is considered to be suspect depending on the particular context of use proper to the terminal.

6.2 Description of the Functional Block Diagram of the Invention

Here below, we consider an example of implementation of the invention for a payment terminal.

Figure 1:
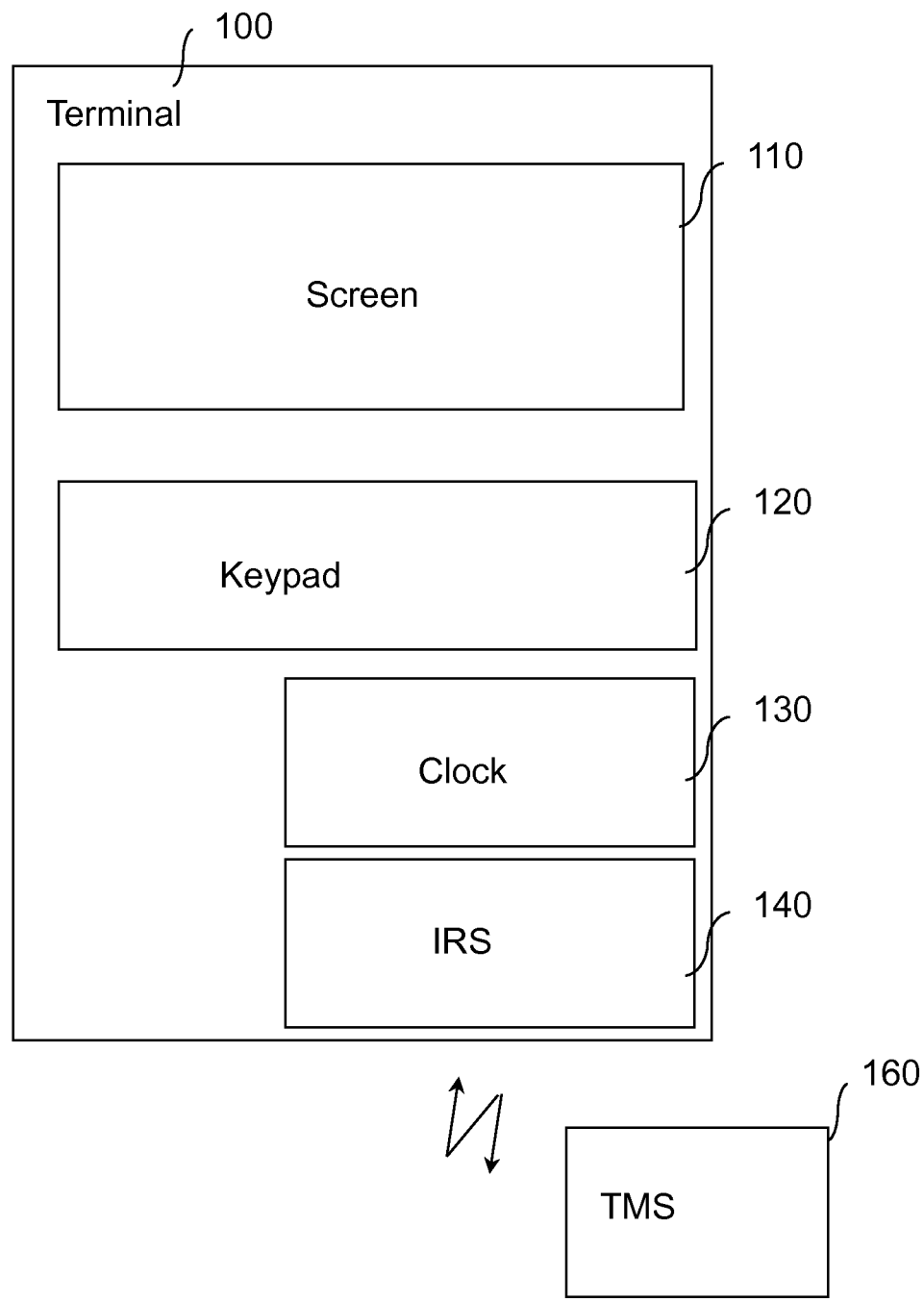

Referring to FIG. 1, we present a particular embodiment of implementation of the method according to the invention.

In this particular embodiment of the invention, a payment terminal 100 enables a user to make payments and transmit information on these payments to other remote management systems 160, for example a terminal management system (TMS).

Such a terminal is provided with interface control components, enabling an exchange of information with a user of the terminal. It comprises for example a screen 110 to render information or make an interrogation to a user and a keypad 120 enabling the entry of data by a user. It can be a hardware keypad 120 (as shown in FIG. 1) or a virtual keypad appearing for example on the screen 110.

According to the invention, the terminal also comprises means (130, 140) for determining the value of a piece of information characterizing a context of the terminal, for example by means of electronic components implanted in the mother board of the terminal 100.

In particular, in the embodiment presented in FIG. 1, the terminal can include means 130 such as a clock to determine a current time. It can also be provided with means for synchronizing this clock with at least one time referential system.

In the particular embodiment illustrated in FIG. 1, the terminal in addition comprises means 140 for determining a position or a variation of a position of the terminal. It can for example be means for localizing the terminal, for example by GPS and/or means for determining a movement or an orientation of the terminal. It may be at least one accelerometer for the measurement of linear accelerations and/or at least one gyrometer for the measurement of angular speeds and/or at least one inertial reference system (IRS) to measure several accelerations and/or angular speeds at the same time or again at least one inclinometer to measure an orientation of the terminal.

Thus, according to the particular embodiment illustrated in FIG. 1, the terminal comprises an inertial reference system 140.

In certain particular embodiments where the rendering of the information viewed on the screen 110 of the terminal 100 is influenced by a movement or an orientation of the terminal 100, a same inertial reference system can be used both to define the rendering of the information on the screen and to implement the method of the invention. In other embodiments, the terminal can include several inertial reference systems, some being dedicated to the definition of a rendering and others to the method of the invention.

In other embodiments, possibly complementary ones, the terminal can include other means for detecting a handling of the terminal, for example means for detecting pressure applied to a portion of the terminal.

Figure 2:
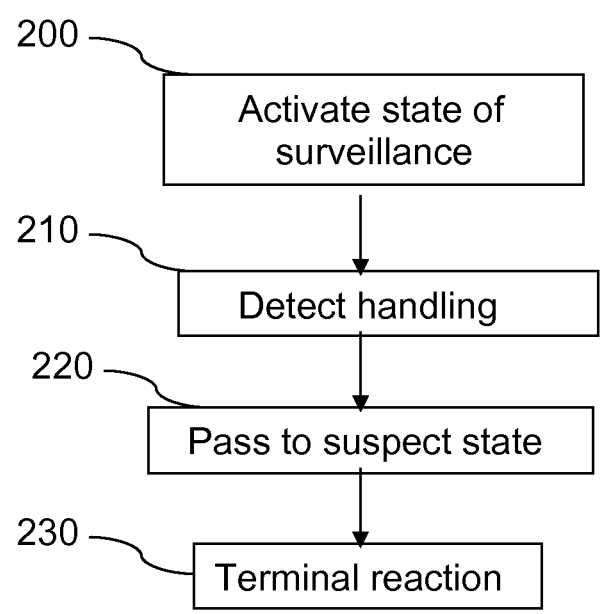
FIG. 2 illustrates the dynamic working of the principle of the invention based on the static block diagram of FIG. 1.

6.3 Description of the Dynamic Operation of the Invention Referring to FIG. 2, we present the principle of dynamic operation of the invention in one particular embodiment, compatible with the terminal that is the object of FIG. 1.

The method of the invention thus comprises a step 200 for activating the state of surveillance of the terminal.

When the terminal is in a state of surveillance, the method then comprises a step 210 for detecting a handling operation performed on the terminal. Depending on the embodiments of the invention, this may be a particular handling detected by a particular detection means (for example an inertial reference system in the case of a movement, an overturning or a partial rotation of the terminal) or any handling operation detected by any one of the means for detecting a handling of the terminal.

For example, this may be the simple use of an interface component of the terminal or a pressure applied to a wall of the casing of the terminal, for example when the terminal is held in the hand.

The detection of such handling causes the passage 220 of the terminal into a state called a suspect state representing a risk of an attempt at fraudulent use of the terminal, and is followed by a step 230 for activating a reaction of the terminal.

In certain embodiments of the invention, this reaction can be local. It can be for example an at least partial blocking of the terminal, and/or an erasure and/or a falsification and/or a corruption of at least one part of the sensitive data of the terminal and/or the recording of information representing the handling (especially the date, time, nature of the handling and/or identification of at least one means of detection having enabled the detection).

In other embodiments, possibly complementary ones, the step of reaction can implement means of communication towards a qualified or authorized third party such as an owner of the terminal, a remote surveillance center of a police department or a private company or again a remote operational service in the context of a terminal management system (TMS).

It may be especially an audio call, when the terminal possesses voice synthesis means for example, or means for generating SMS or email type text messages for example or again, when the terminal possesses image or video acquisition means, it may be the sending of a multimedia stream pertaining to the instant of the handling, enabling an authorized third party to easily check whether an attempt to reach the terminal has really taken place or whether this is a false alarm (for example a manipulation that can be attributed to an animal or to a dropping of an object). Such a multimedia stream can in addition help in determining the identity of the ill-intentioned third parties.

In one variant, the actions performed locally by the terminal can especially be commanded remotely by the authorized third party.

In certain embodiments, the reaction 230 of the terminal can also include a step for updating a level of alert presenting a probability of an attempt at fraudulent use of said terminal and a step for implementing at least one reactive action of the terminal, following the detected handling operation, as a function of the level of alert.

For example, when the surveillance of the terminal is activated, the level of alert of the terminal can be fixed at its minimum value (value "0" for example) and each handling operation can prompt the incrementing of the level of alert. Each first value ("1" for example) can have a corresponding local reactive action of the terminal, for example a local recording, at the terminal, of information representing the handling, or a request for entry of a maintenance code on the terminal for example. A second level of alert (value "2" for example) can have a corresponding action that is the sending of an alarm (audio, text or visual alarm) to an authorized third party. A third level of alert may have a corresponding falsification or corruption of sensitive data. Such a mode of reaction makes it possible to have available a response that is proportionate to the probability of the threat, so as not to impair the operational working of the terminal because of a false alarm for example.

The method can also comprise a step for resetting the level of alert at its minimum value following a decision by an authorized third party (concluding that there has been a false alarm for example).

In certain embodiments, the method can additionally comprise a step for deactivating the state of surveillance of the terminal. This step can especially be implemented during an operation of maintenance of the terminal.

6.4 Description of a First Particular Embodiment of the Invention

Figure 3:
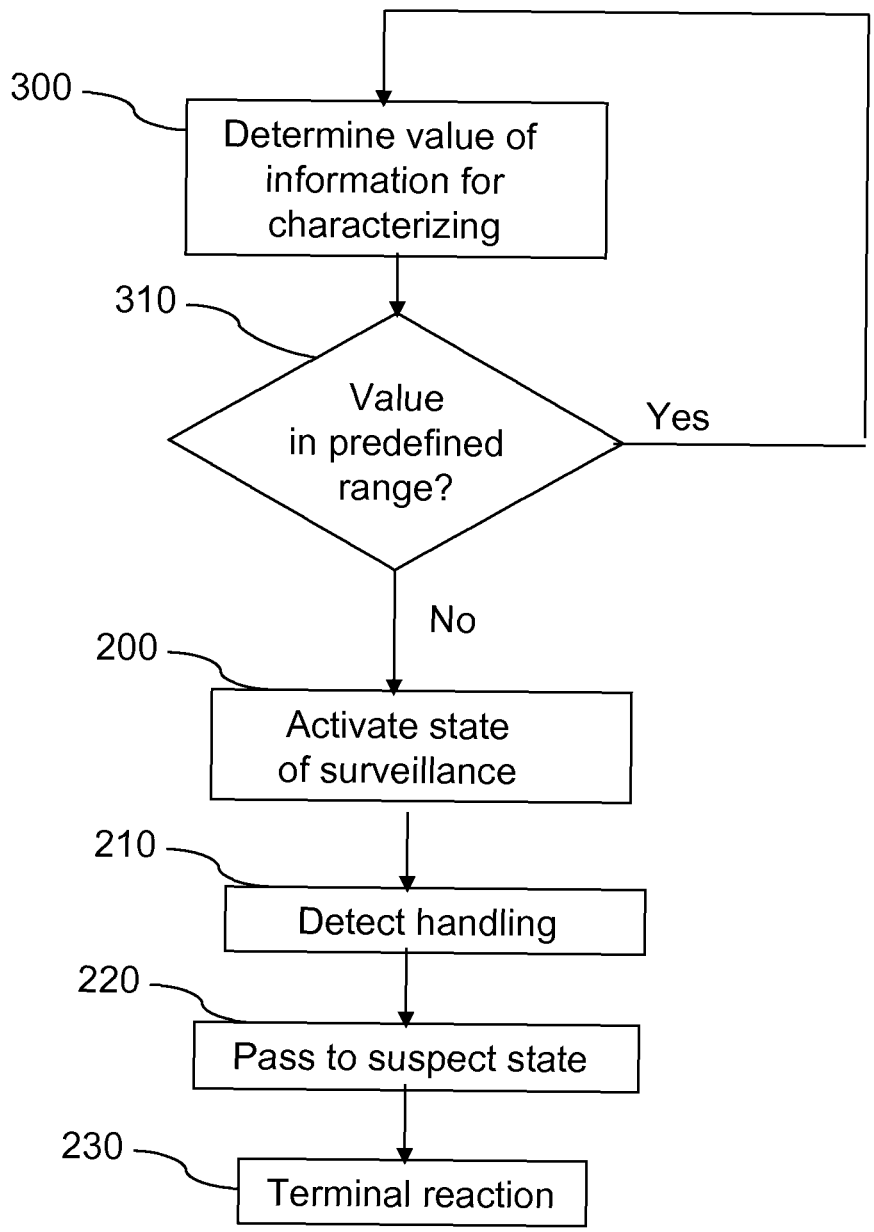
FIG. 3 illustrates the dynamic working of a first particular embodiment of the invention.

Referring to FIG. 3, we present a first particular embodiment of the invention adapted for example to surveillance of a portable payment terminal placed in a restaurant.

In this particular embodiment, the step 200 for activating the surveillance of the terminal is implemented automatically by the terminal, when the current value of at least one piece of information characterizing the context of the terminal (for example the current time) is situated in a predefined range of values (for example a time-slot when the restaurant is closed).

The method thus comprises a step 300 for determining the current value of the information for characterizing, and then a step 310 for comparing this current value with a predefined range of values. This range of values can especially have been defined by a parametrizing of the terminal, done locally by an operator (the restaurant owner or installer of the terminal) through the interface control components of the terminal, or done remotely from a server dedicated to the management of the fleet of terminals to which the terminal belongs. This parametrizing can especially take account of the time zone in which the terminal is situated, the days of closure of the establishment (weekends, holidays or vacations) or of maintenance of the terminal. It can also be done automatically, through synchronization with data contained in a diary and/or an electronic calendar stored locally on the terminal or on a remote server.

In addition, the method can especially comprise a step for deactivating the state of surveillance of the terminal, for example when the information for characterizing the context of the terminal is situated again in the predefined range of values.

The invention thus enables an automatic protection of the terminal, without daily action by an operator, activated solely at the time slots of closure of the place in which the terminal is situated.

In the first particular embodiment of the invention illustrated in FIG. 3, the steps 210, 220 and 230 commented upon with reference to FIG. 2 are seen again.

6.5 Description of a Second Particular Embodiment of the Invention

Figure 4:
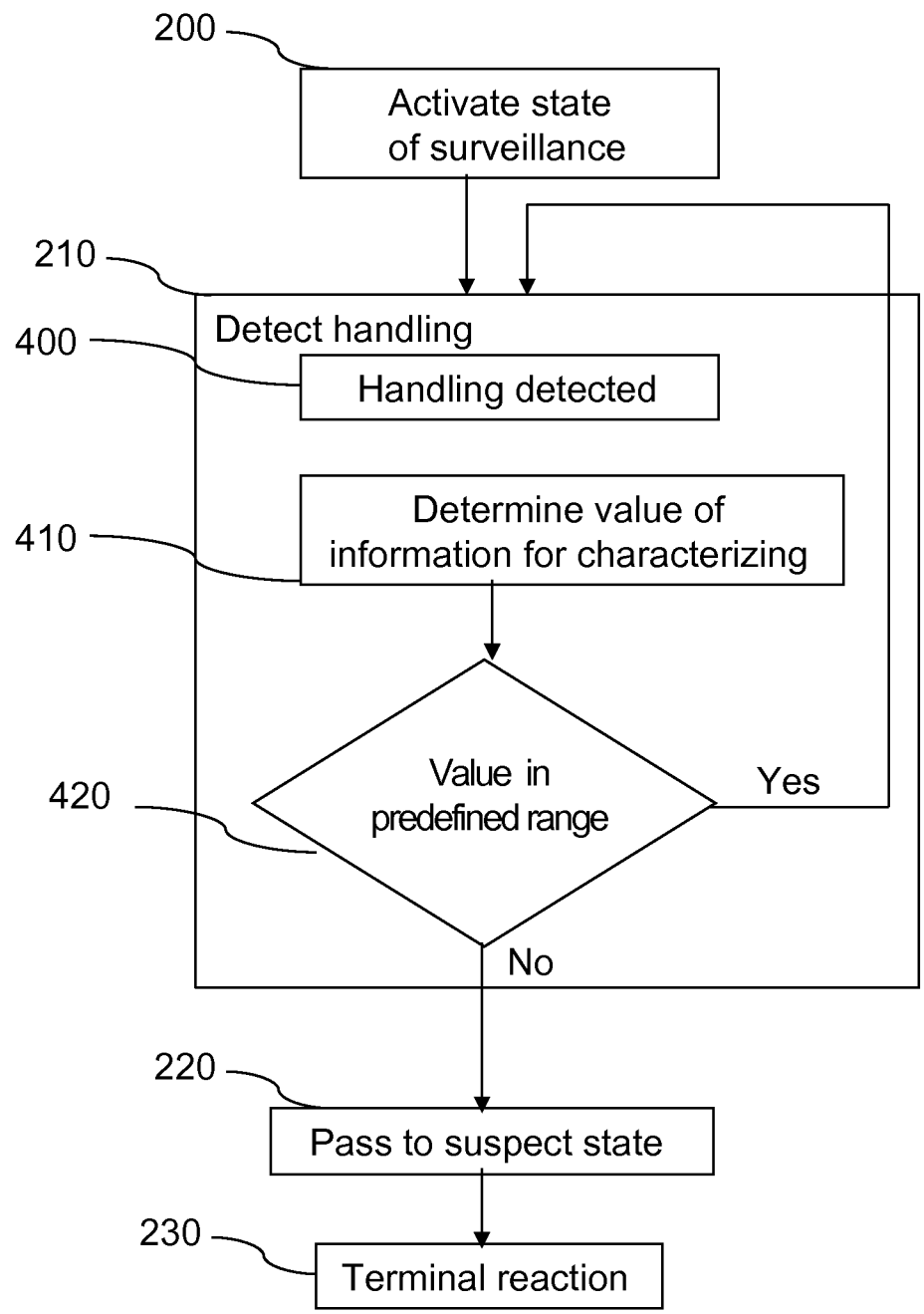
FIG. 4 illustrates the dynamic working of a second particular embodiment of the invention.

Referring to FIG. 4, we present a second particular embodiment of the invention adapted for example to a surveillance of an electronic terminal enslaved/linked to a support fixedly or in such a way that its movements are restricted, for example by means of a wire connection. Such a terminal can for example be situated in a store.

In this particular case, after activation 200 of the state of surveillance, the step of detection 210 of a manipulation comprises a sub-step 410 for determining the current value of a piece of information characterizing a context of the terminal and a sub-step 420 for comparing this current value with a predefined range of values. This sub-step 410 for determining can especially follow any detected handling 400.

In the embodiment illustrated, it can be for example a piece of information for characterizing related to a position and/or a movement (shift, rotation, acceleration) of the terminal. Indeed, any movement of the terminal, which is impossible in practice because of the link of the terminal with the support, could be considered to be suspect because it takes place during the store's opening or closing times. It could for example be an attempt to overturn the terminal in order to replace it by a corrupted terminal or an attempt to steal the terminal, In the second particular embodiment illustrated in FIG. 4, steps 220 and 230 commented upon with reference to FIG. 2 are then seen again.

6.6 Description of Other Particular Embodiments of the Invention

The two embodiments presented here above can of course be combined and implement different pieces of information on characterization.

For example, in one particular embodiment, the activation of the state of surveillance of the terminal can be done automatically by comparing the current time and date with a predefined range of time-stamped values and the step 210 for detecting a handling will comprise the determining of an orientation of the terminal and its comparison with a predefined angular range and the determining of a current location of the terminal and its comparison with a predetermined geographical zone or again the determining of a current acceleration of the terminal and its comparison with a predetermined maximum value, the detection of a high acceleration, not compatible with a current use, which could mean that a grab-and-run theft has taken place.

Such embodiments are for example also adapted to the surveillance of a fixed portable terminal on a support during the closing times of a restaurant or a secretariat, especially in order to recharge the battery of the terminal. They make it possible especially to react routinely with any movement of the terminal but only during the restaurant's or secretariat's closing times.

6.7 Structure of an Electronic Terminal According to the Invention

Figure 5:
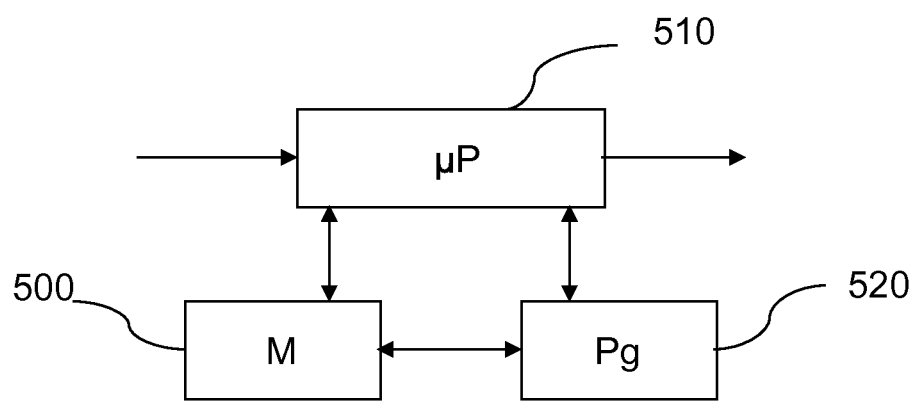
FIG. 5 illustrates the structure of a terminal according to the invention.

Referring to FIG. 5, we present the simplified structure of an electronic terminal according to the invention.

In addition to the functional elements described in detail in FIG. 1, such a terminal comprises a memory 500 comprising a buffer memory, a processing unit 510, equipped for example with a microprocessor μP, and driven by a computer program 520, the execution of which implements a method of protection according to one of the particular embodiments of the invention.

At initialization, the code instructions of the computer program 520 are for example loaded into a RAM and then executed by the processor of the processing unit 510.

The processing unit 510 inputs a header of a data stream.

The microprocessor of the processing unit 510 implements the steps of the method of protection described here above according to the instructions of the computer program 520.

To this end, the electronic terminal comprises, in addition to the buffer memory 500:
- means for activating a state of surveillance of the terminal;
- in the state of surveillance, means for detecting a handling of the terminal generating the passage of the terminal into a state known as a suspect state, representing a risk of an attempt at fraudulent use of the terminal;
- in said suspect state, means for activating a reaction by the terminal;
- said means for activating a reaction comprising means for updating a level of alert, representing a probability of an attempt at fraudulent use of the terminal, and means for implementing at least one reactive action as a function of said level of alert.

These means are driven by the microprocessor of the processing unit 510.

According to one embodiment, the invention is implemented by means of software and/or hardware components. To this end, the term "means" can correspond in this document equally well to a software component and to a hardware component or to a set of hardware and software components.

A software component corresponds to one or more computer programs, one or more sub-programs of a program or more generally to any element of a program or of a piece of software capable of implementing a function or a set of functions as described here below for the means concerned. Such a software component is executed by a data processor of a physical entity (terminal, server, gateway, set-top box, router, etc.) and is capable of accessing the hardware resources of this physical entity (memories, recording media, communication buses, input/output electronic boards, user interfaces, etc.).

In the same way, a hardware component corresponds to any element of a hardware set capable of implementing a function or a set of functions according to what is described here below for the module concerned. It may be a programmable hardware component or a component with an integrated circuit for the execution of the software, for example an integrated circuit, a smart card, a memory card, an electronic board to execute an item of firmware, etc.

The terminal according to the invention can especially include the software or hardware components illustrated in FIG. 1.

An exemplary embodiment of the present disclosure provides an electronic terminal that is more robust against attacks and enables especially a more reliable detection of theft or of an attempt to misuse a terminal by uncovering symptoms that are as yet unknown.

An exemplary embodiment of the present disclosure proposes a discreet solution, not detectable by the third party responsible for attacking the terminal, in a way especially designed to assist surveillance services and/or police forces to confound these third parties.

An exemplary embodiment of the present disclosure provides a solution enabling immediate detection of the attack.

An exemplary embodiment of the present disclosure provides a solution that is easy to implement for manufacturers of the payment system.

Although the present disclosure has been described with reference to one or more examples, workers skilled in the art will recognize that changes may be made in form and detail without departing from the scope of the disclosure and/or the appended claims.

The invention claimed is:

1. A method for protecting an electronic terminal comprising:
   activating a state of surveillance of said terminal when a current value of at least one piece of information characterizing a context of said terminal is situated in a predefined range of values of said information, and assigning a minimum value to a level of alert;
   in said state of surveillance, detecting a first handling of said terminal and passing said terminal into a suspect state, representing a risk of an attempt at fraudulent use of said terminal; and
   in said suspect state, triggering a reaction by said terminal, wherein said reaction of said terminal comprises updating the level of alert, which represents a probability of an attempt at fraudulent use of said terminal and implementing at least one reactive action according to said level of alert, wherein updating the level of alert comprises:
      in response to detecting of the first handling, updating the level of alert to a first value and implementing a first reactive action according to said first value; and
      in response to detecting a second, subsequent handling, updating the level of alert from the first value to a second value, and implementing a second, different reactive action according to said second value.

2. The method for protecting an electronic terminal according to claim 1 wherein said detecting a handling of said terminal comprises a sub-act of comparing the current value of at least one piece of further information characterizing a context of said terminal with a further predefined range of values of said further information.

3. The method for protecting an electronic terminal according to claim 1, wherein said first and second handlings belong to the group of events consisting of:
   an action on an input control component of an interface of said terminal;
   an overturning of said terminal;
   a partial rotation of said terminal;
   a shift of said terminal;
   a pressure on a portion of a casing of the terminal;
   a combination of at least two of said events.

4. The method for protecting an electronic terminal according claim 1, wherein said piece of information belongs to the group consisting of:
   a piece of information coming from a time-stamp;
   an orientation of said terminal;
   a localizing of said terminal;
   an acceleration or a speed of movement of said terminal;

a combination of at least two of the pieces of information in the group.

5. The method for protecting an electronic terminal according to claim 1, wherein the method furthermore comprises deactivating said state of surveillance.

6. The method for protecting an electronic terminal according to claim 1, wherein said first and second reactive actions belong to the group consisting of:
   an at least partial blocking of said terminal;
   an erasure of at least one part of sensitive data of said terminal;
   a falsification and/or a corruption of at least one part of the sensitive data of said terminal;
   a sending of a warning message;
   a recording by said terminal of at least one piece of information representing said handling;
   a combination of at least two of said actions of said group.

7. A non-transitory computer-readable medium comprising a computer program product stored thereon and comprising program code instructions to implement a method for protecting an electronic terminal, when said program is executed on a computer, wherein the instructions comprise:
   instructions that configure the terminal to activate a state of surveillance of said terminal when a current value of at least one piece of information characterizing a context of said terminal is situated in a predefined range of values of said information, and assigning a minimum value to a level of alert;
   instructions that configure the terminal to, in said state of surveillance, detect a first handling of said terminal and passing said terminal into a suspect state, representing a risk of an attempt at fraudulent use of said terminal; and
   instructions that configure the terminal to, in said suspect state, trigger a reaction by said terminal, wherein said reaction of said terminal comprises updating the level of alert, which represent a probability of an attempt at fraudulent use of said terminal and implementing at least one reactive action according to said level of alert, wherein updating the level of alert comprises:
      in response to detecting of the first handling, updating the level of alert to a first value and implementing a first reactive action according to said first value; and
      in response to detecting a second, subsequent handling, updating the level of alert from the first value to a second value, and implementing a second, different reactive action according to said second value.

8. An electronic terminal comprising:
   means for activating a state of surveillance of said terminal when a current value of at least one piece of information characterizing a context of said terminal is situated in a predefined range of values of said information, and assigning a minimum value to a level of alert;
   in said state of surveillance, means for detecting a first handling of said terminal, generating the passage of said terminal into a suspect state, representing a risk of an attempt at fraudulent use of said terminal; and
   in said suspect state, means for triggering a reaction by said terminal, wherein said means for triggering a reaction by said terminal comprise means for updating the level of alert, which represent a probability of an attempt at fraudulent use of said terminal, and means for implementing at least one reactive action as a function of said level of alert, wherein updating the level of alert comprises:
      in response to detecting of the first handling, updating the level of alert to a first value and implementing a first reactive action according to said first value; and
      in response to detecting a second, subsequent handling, updating the level of alert from the first value to a second value, and implementing a second, different reactive action according to said second value.

9. The method for protecting an electronic terminal according claim 2, wherein said piece of further information belongs to the group consisting of:
   a piece of information coming from a time-stamp;
   an orientation of said terminal;
   a localizing of said terminal;
   an acceleration or a speed of movement of said terminal;
   a combination of at least two of the pieces of information in the group.

10. The method for protecting an electronic terminal according claim 2, wherein said piece of further information belongs to the group consisting of:
    a piece of information coming from a time-stamp;
    an orientation of said terminal;
    a localizing of said terminal;
    an acceleration or a speed of movement of said terminal;
    a combination of at least two of the pieces of information in the group.

* * * * *